(12) United States Patent
Nardone et al.

(10) Patent No.: US 8,370,904 B2
(45) Date of Patent: Feb. 5, 2013

(54) NODE AUTHENTICATION (75) Inventors: Massimo Nardone, Helsinki (FI);
Anders Westberg, Spanga (SE)

(73) Assignee: International Business Machines Corporation, Armonk, NY (US)

( * ) Notice: Subject to any disclaimer, the term of this patent is extended or adjusted under 35 U.S.C. 154(b) by 1267 days.

(21) Appl. No.: 12/118,921

(22) Filed: May 12, 2008

(65) Prior Publication Data
US 2008/0313715 A1 Dec. 18, 2008

(30) Foreign Application Priority Data
Jun. 12, 2007 (EP) .................................. 07110091

(51) Int. Cl.
*H04L 29/06* (2006.01)
(52) U.S. Cl. ............. 726/4; 709/223; 709/242; 455/411
(58) Field of Classification Search .................. 709/223, 709/225; 726/4; 713/155; 380/277
See application file for complete search history.

(56) References Cited

U.S. PATENT DOCUMENTS

| | | | | |
|---|---|---|---|---|
| 5,101,348 A | * | 3/1992 | Arrowood et al. | 709/242 |
| 2002/0025812 A1 | * | 2/2002 | Ahlstrand et al. | 455/435 |
| 2002/0184357 A1 | * | 12/2002 | Traversat et al. | 709/223 |
| 2003/0105865 A1 | * | 6/2003 | McCanne et al. | 709/225 |
| 2005/0114650 A1 | * | 5/2005 | Rockwood et al. | 713/155 |
| 2007/0099597 A1 | * | 5/2007 | Arkko et al. | 455/411 |
| 2009/0080344 A1 | * | 3/2009 | Park et al. | 370/254 |

OTHER PUBLICATIONS

Draft commitee, "Draft Standard for Local and Metropolitan Area Networks", IEEE, Dec. 2007.*
Balfe et al., "Trusted Computing: Providing Security for Peer-to-Peer Networks", Information Security Group, Royal Holloway, University of London, United Kingdom, http://www.intel.com/technology/security, http://www.microsoft.com/resources/ngscb/default.mspx.
Lu et al., "Trust-Based Privacy Preservation for Peer-to-Peer Data Sharing", Department of Computer Sciences, Purdue University, West Lafayette, IN 47907. This Research is supported by NSF grants ANI-0219110 and IIS-0209059.
Zhu et al., "Promoting Cooperation Among Strangers to Access Internet Services from an Ad Hoc Network". This research is supported by NSF Grants No. 0334035, 0098017, 9911074, NIH Grant No. EB002238-01, and a grant from Microsoft Research, Proceedings of the Second IEEE Annual Conference on Pervasive Computing and Communications (PERCOM'04).
Yolum et al., "Engineering Self-Organizing Referral Networks for Trustworthy Service Selection", IEEE Transactions of Systems, Man and Cybernetics—Part A: Systems and Humans, vol. 35, No. 3, May 2005, pp. 396-407.

* cited by examiner

*Primary Examiner* — David Pearson
*Assistant Examiner* — Gregory Lane
(74) *Attorney, Agent, or Firm* — Douglas A. Lashmit; Hoffman Warnick LLC (57) ABSTRACT

A system and method of accessing a service on a terminal node. The system includes a chain of nodes, the chain comprising a first node, one or more intermediate nodes, and the terminal node, the terminal node maintaining the service, wherein the first node is arranged to initiate an access request and to transmit the access request to an adjacent node, each intermediate node is arranged to authenticate the transmitting node and to transmit the access request to an adjacent node, and the terminal node is arranged to authenticate the transmitting node and to execute the access request.

6 Claims, 7 Drawing Sheets

NODE AUTHENTICATION

FIELD OF THE INVENTION

This invention relates to a system and method of accessing a service on a node.

RELATED ART

In distributed computing environments, such as the Internet, a large number of client devices and servers are interconnected, and each can be considered as a node in a network. Nodes in the network can offer services to other nodes that can connect to that specific node. The offered service may be something relatively simple such as a database of information, or may be a more complex e-commerce arrangement such as a shopping website offering goods for purchase. A very high proportion of the nodes that offer services need to carry out an authentication process on any node that makes an access request to the node offering the service.

At the present time, there are two principal methods by which this authentication is executed. A first method is for the node that is offering the service and the node that is making the access request to the service to be connected in a secure manner. This requires the node offering the service to directly authenticate the node that is requesting access, usually by receiving from the node an encrypted but recognizable authentication datum such as a password or certificate. In this way, the node offering the service is able to authenticate the accessing node. The main disadvantage of this authentication method is that the only nodes that can securely access the offered service are those nodes for which there is an already existing confirmed security procedure with the node offering the service.

A second existing method of authenticating a node uses a central repository of information detailing authenticated nodes. Such a system is divulged in United States Patent Application Publication US2005/0114650, which discloses a hybrid authentication system for securing communication. The system includes a distributed authentication infrastructure with a series of nodes in communication with each other. These nodes are intended to perform a series of functions, one of these functions being the authentication of other nodes. The system further includes a centralized authentication infrastructure, which is later integrated into the distributed authentication infrastructure after the distributed authentication infrastructure has been established. The centralized authentication infrastructure includes a central server coupled to the nodes for verifying the identification of the nodes and/or granting permission to those nodes. The main disadvantage of this type of authentication method is that there is an additional requirement of the upkeep of the central repository, which is non-trivial in size. Equally, the central repository system maintains a barrier to new services being offered and new nodes accessing existing services, as these must all be correctly logged with the authentication infrastructure.

SUMMARY OF THE INVENTION

According to a first aspect of the present invention, there is provided a system for accessing a service on a terminal node, the system comprising a chain of nodes, the chain comprising a first node, one or more intermediate nodes, and the terminal node, the terminal node maintaining the service, wherein the first node is arranged to initiate an access request and to transmit the access request to an adjacent node, each intermediate node is arranged to authenticate the transmitting node and to transmit the access request to an adjacent node, and the terminal node is arranged to authenticate the transmitting node and to execute the access request.

According to a second aspect of the present invention, there is provided a method of accessing a service on a terminal node, the node forming part of a system comprising a chain of nodes, the chain comprising a first node, one or more intermediate nodes, and the terminal node, the terminal node maintaining the service, the method comprising: initiating an access request at the first node, transmitting the access request to an adjacent node, authenticating the transmitting node at the adjacent node, repeating the transmitting and the authenticating for further nodes in the chain, receiving the access request at the terminal node, authenticating the transmitting node at the terminal node, and executing the access request.

Owing to the invention, it is possible to provide a system and method that allows simple access to services offered by nodes in a network, in a secure fashion, but without the disadvantages of the prior art systems, as there is no need to maintain any central repository of authenticated nodes, nor is there the requirement that the node offering the service must directly authenticate the node requesting access to the service. In this system, each node only authenticates adjacent nodes, and this creates a chain of "proxy trust" between nodes in the network.

Advantageously, each node includes a database storing a list of authenticated nodes, the list identifying adjacent nodes that are authenticated. By storing a local list of the authenticated adjacent nodes, each node can carry out the authentication of a node in a very simple and efficient manner.

Each node may include a database storing a list of available services, each available service in the list provided by an external node having associated details of an adjacent node through which the respective service is accessible. If a node maintains a list of services that are available, then this can be easily discovered by enquiry. The storage of the details of the adjacent node through which external services can be found assists the correct routing of any access request that is received. Ideally, each node in the chain is arranged, upon receipt of a specific request from an authenticated node, to transmit the list of available services to the authenticated node.

Beneficially, each node in the chain is arranged, upon receipt of an access request from an authenticated node, to encapsulate the access request with a local identifier. This method of passing on access requests, by wrapping the request in a local identifier, assists the authentication procedure, when the access request is passed to the next node.

DETAILED DESCRIPTION OF THE INVENTION

Embodiments of the present invention will now be described, by way of example only, with reference to the accompanying drawings.

DETAILED DESCRIPTION OF THE INVENTION

Figure 1:
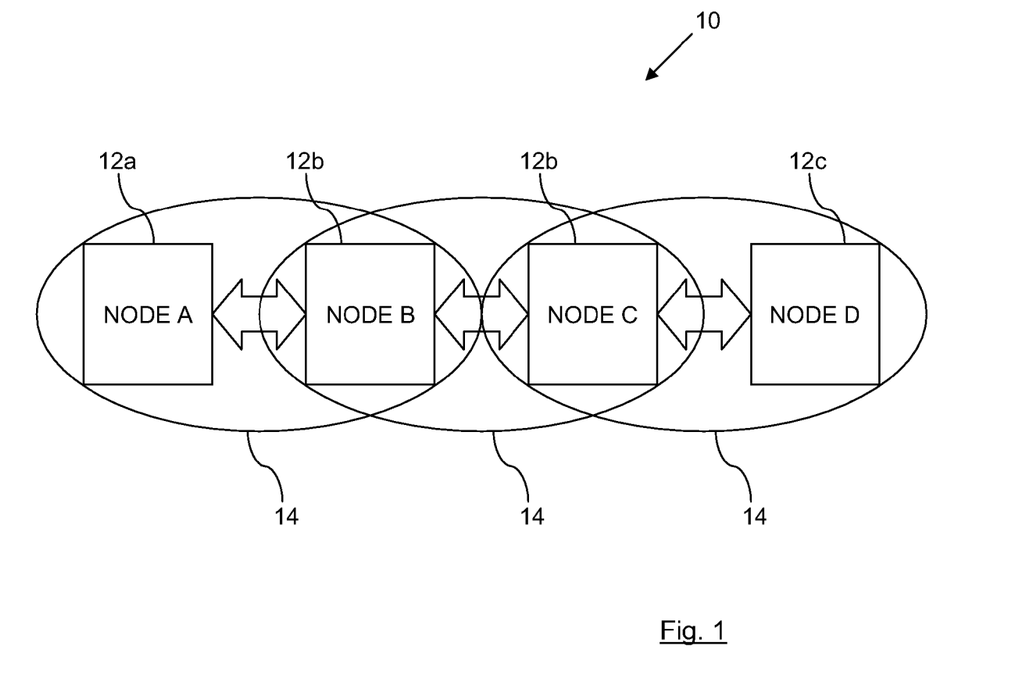
FIG. 1 is a schematic diagram of a chain of nodes.

A chain 10 of nodes 12 is shown in FIG. 1. One purpose of the invention is to describe a secure distributed trust for authentication between two or more nodes. Instead of having a central component to which all nodes double check authentication credentials or having large "trust domains" to which all nodes need to be known, the idea is to have only peer-to-peer trust, and then have nodes to authenticate to other nodes on behalf of entities known to the node itself. An example of a solution would be a set of nodes that is known to each other via a peer-to-peer schema. Although a "chain" of nodes is shown in FIG. 1, it will be appreciated that the chain 10 is a part of a much larger network of nodes 12, with multiple connections between nodes 12. However any connection between two nodes 12 can be considered as a chain 10 of nodes 12.

FIG. 1 describes the idea. The chain 10 of nodes 12 has a first node 12a, intermediate nodes 12b, and a terminal node 12c. Node A knows node B, node B know node A and node C etc., but node D does not know node A. Zones 14 define adjacent nodes that are authenticated. An example of the solution is shown in FIG. 1. The solution allows for a much simplified architecture for security and authentication/authorization. There is no need to for a common user catalogue or any third party authentication repository. Everything is based on a "chain of trust". For example, a user that connects to note A, and is trusted by that node, will be trusted by node B on the basis that node B trusts node A and, as a result, node B does not need to execute any authentication/authorization actions with respect of that user.

One of the main issues when building large infrastructures, where multiple domains need to authenticate users between each other, is the need for common user libraries, passing of certificates, etc. Especially in a consumer-dealer-producer chain, it is very often a problem that the producers need to have records of all consumers. There are several practical implications of this, where one is the risk of user information belonging to distributor X "leaking" over to distributor Y, as well as the fact that consumer needs to be known to the producer, which is in itself a problem as the producer needs to implement a mechanism to register a very large amount of users in their system. Therefore, one of the advantages of this solution compared to existing solutions is the total isolation of the end-user from applications.

Figure 2:
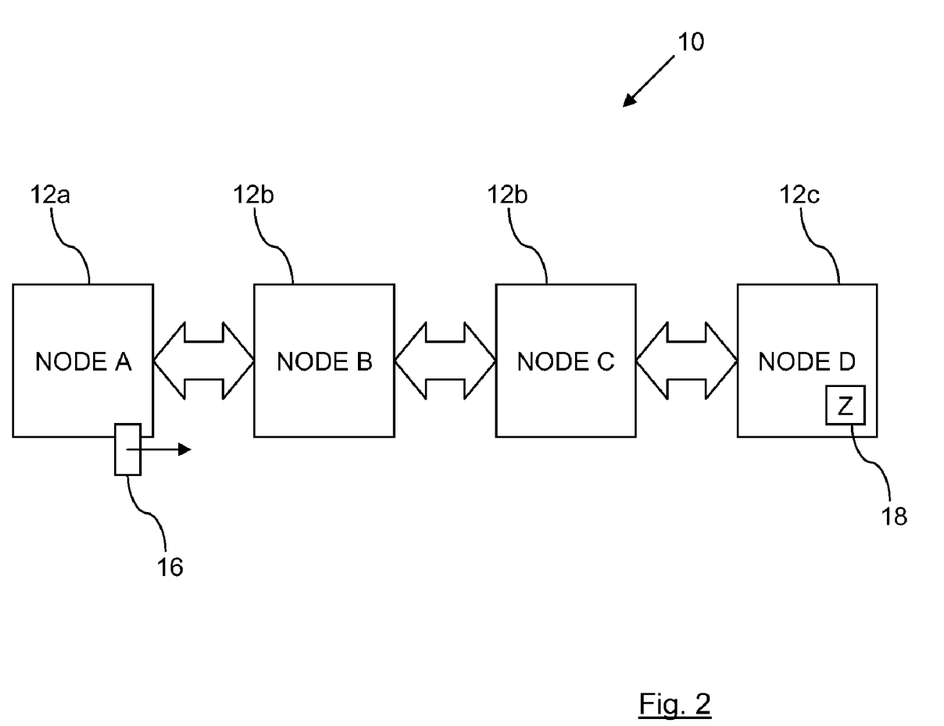
FIG. 2 is a further schematic diagram of the chain of nodes.

FIG. 2 shows the chain 10 of nodes 12 in operation. The system is providing access to a service 18 on the terminal node 12c. The chain 10 comprises a first node 12a, one or more intermediate nodes 12b, and the terminal node 12c, which is maintaining the service 18. The first node 12a is arranged to initiate an access request 16 and to transmit the access request 16 to an adjacent node, in this case node B.

Each intermediate node 12b is arranged to authenticate the transmitting node and to transmit the access request 16 to an adjacent node, and the terminal node 12c is arranged to authenticate the transmitting node and to execute the access request 16. In this way the node A accesses the service Z on node D is a secure fashion, without the need for node D to directly authorize the accessing node. Because node D trusts node C, and the access comes from a trusted node, the terminal node D does not to authenticate, or even know about, the source node.

Figure 3:
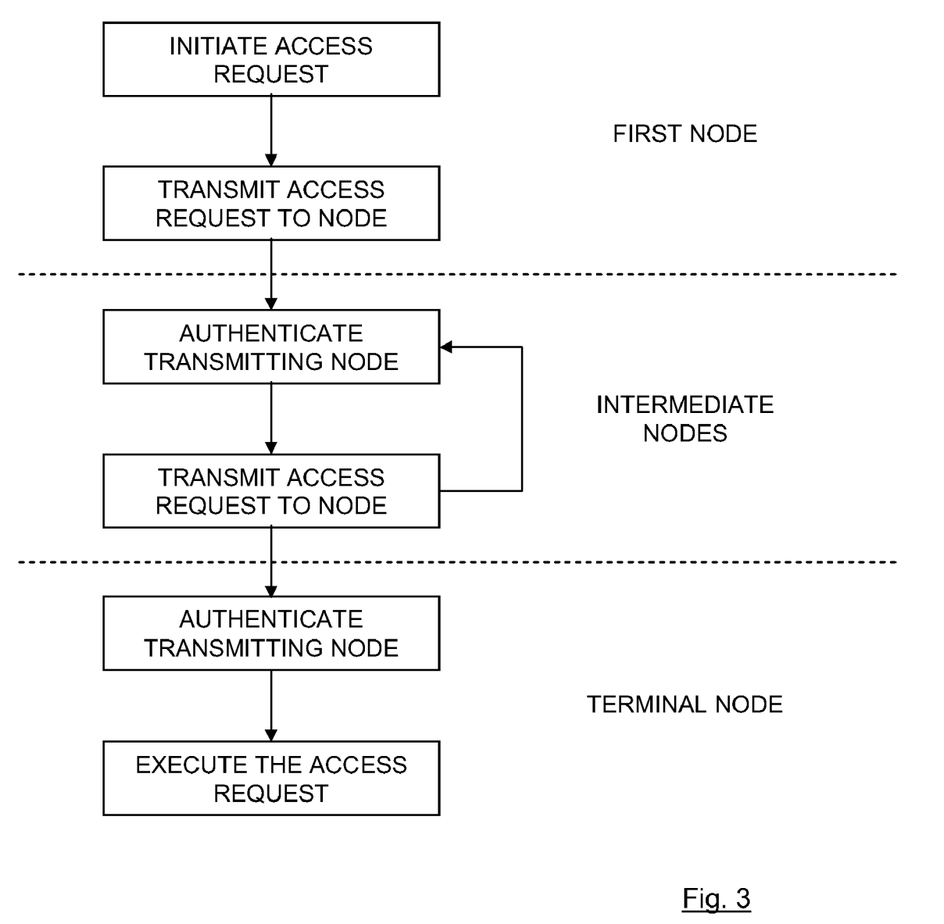
FIG. 3 is a flowchart of a method of accessing a service on a node.

The method of operating the system of FIGS. 1 and 2 is summarized in FIG. 3. The method comprises, at the first node 12a, initiating the access request 16 and transmitting that request to an adjacent node 12. At the intermediate nodes 12b, there is the repetition of authentication of the transmitting node and transmission of the access request 16 to an adjacent node. Finally the access request is received at the terminal node 12c, where again authentication of the transmitting node is carried out, followed by execution of the access request 16. The execution of the access request may be a simple single task, where the first node 12a has made a data request, for example, or the access request 16 may be the opening of an extensive communication between the first node 12a and the terminal node 12c.

The authentication flow is for a user who is accessing node A, but wants to get something executed on node D. The user doesn't know that what he wishes to have executed actually exist on node D, he only know about node A. Node A authenticates the user and encapsulate the user credentials with its own credentials and passes on the request to node B on behalf of the user. Node B accepts the request as it knows node A (but does not know about the user) and there is no need for node B to unpack the user credentials, only looking at node A's credentials. Then node B encapsulates the request and passes it on to node C. Node C will accept the request as it can authenticate node B but have no knowledge of either node A or the user connected to node A. In this way the access request 16 passes along the chain 10. Finally the request 16 will reach node D, which will accept the call 16 as it trusts node C and node D will execute the request 16.

Figure 4:
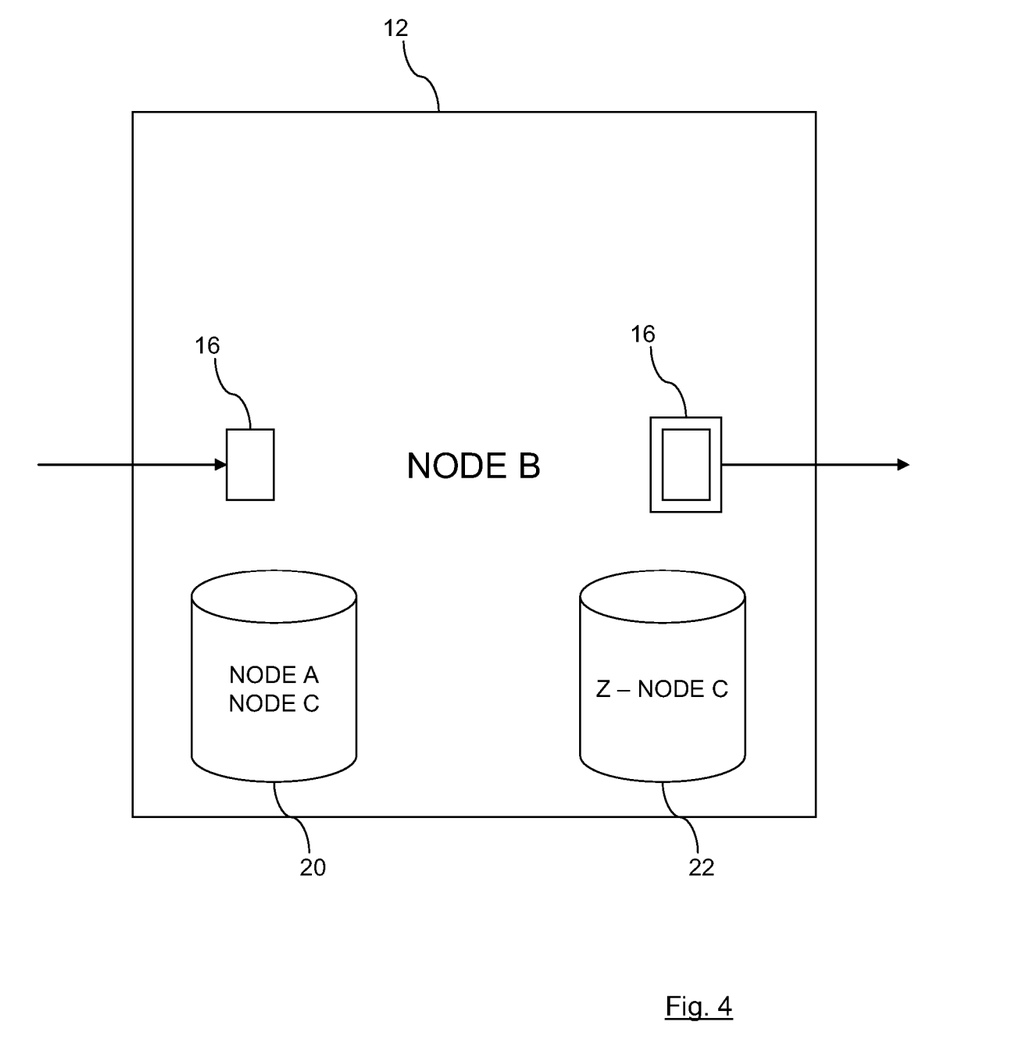
FIG. 4 is a schematic diagram of a node.

A single node 12 is illustrated, in more detail, in FIG. 4. The node 12 includes a database 20 storing a list of authenticated nodes, the list identifying adjacent nodes that are authenticated. The database 20 contains details of the two nodes A and C, which are the adjacent nodes to node B. The database 20 could simply be a list of network addresses of nodes that are authenticated, or could be a list of device details corresponding to the authenticated nodes.

The node 12 also includes a database 22 storing a list of available services, each available service in the list provided by an external node having associated details of an adjacent node through which the respective service is accessible. In the simple example of FIGS. 1 to 4, there is only a single service Z, which is offered by node D. However, node B only stores the details of the node through which that service is available, in this case node C. Node B does not know the final address of the location of the service Z, only the connection to make to reach the service.

Each node 12 in the chain 10 is arranged, upon receipt of a specific request from an authenticated node 12, to transmit the list of available services to the authenticated node 12 that makes the request. This allows discovery of services, for example when a new service is added to an already existing node that is authenticated within a chain of nodes.

FIG. 4 also illustrates the fact that, in an embodiment, each node 12 in the chain 10 is arranged, upon receipt of the access request 16 from an authenticated node, to encapsulate the access request 16 with a local identifier. In FIG. 4, it can be seen that the incoming request 16 has been "wrapped" (in a logical sense) in an identifier that indicates that source of the access request 16 is now the node B. When the request 16 is subsequently transmitted to the next node 12, then that node 12 will identify the source of the request as node B and will check in the local database 20 to see if node B is authenticated.

Figure 5:
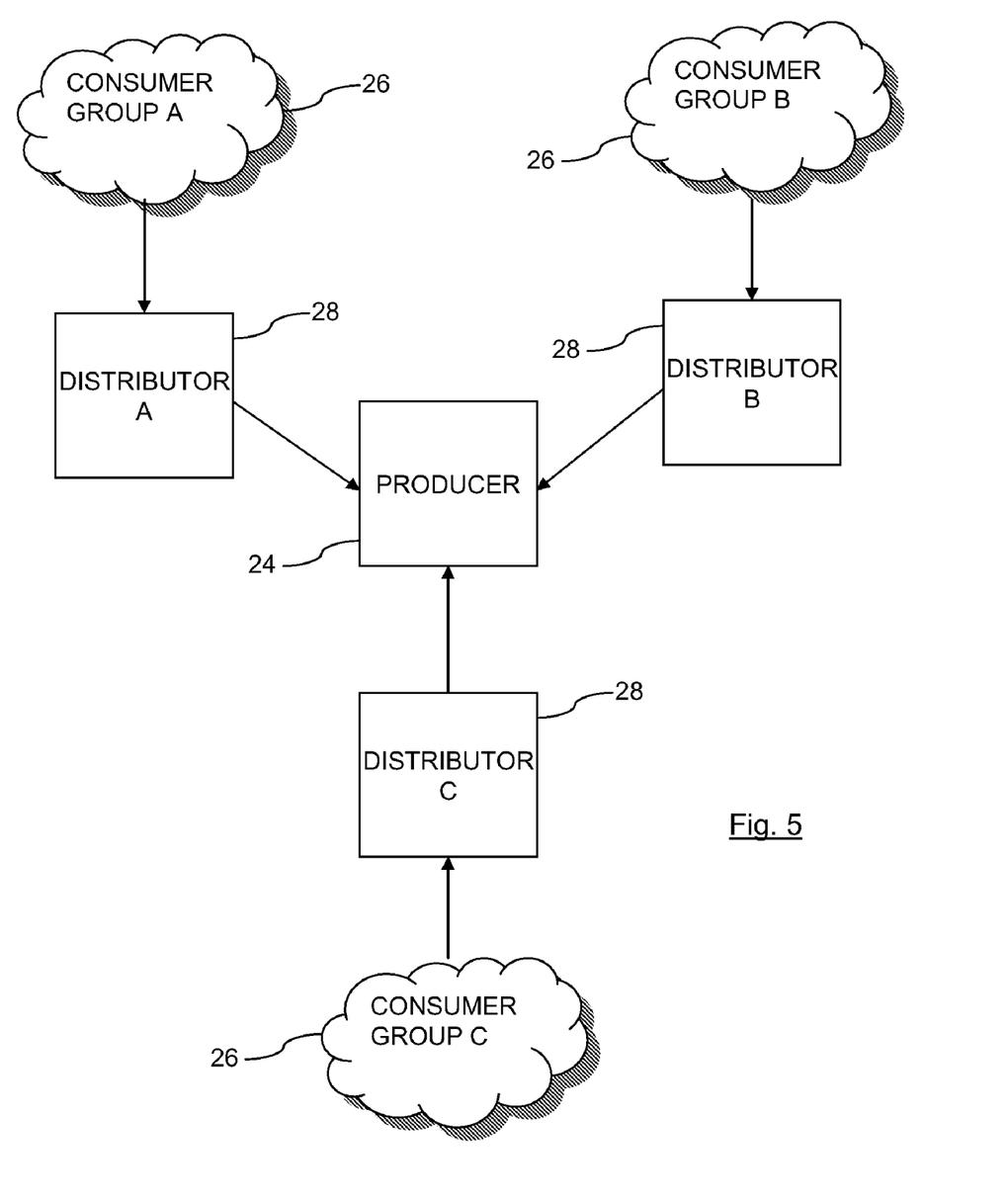
FIG. 5 is schematic diagram of a network of nodes.

An example scenario for the chain 10 could be a consumer-distributor-producer chain, for example in the automobile industry, shown in FIG. 5. A car producer 24 allows consumer 26 to build virtually their new car in an IT-system and directly place the order of the virtually built car, but the interface between the consumers 26 and the producer 24 goes via a distributor 28. Therefore, a consumer 26 accesses the car building solution via the distributor 28.

The distributor front end system takes care of authentication and identification of the consumer (for example, a credit check and validation of address). Then the consumer 26 is passed on to the producer's system. All access to the car building solution of the producer 24 is authenticated and authorized via the distributor's credentials on behalf of the consumer 26. When a consumer 26 from group A accesses the service provide by the producer 24, neither the producer 24 nor the other distributors 28 are aware or know anything about that consumer 26.

The system, which comprises a chain of nodes from within a network of nodes provides a method where the chain of nodes are connected in a chain of trust and each node only know about their peer on each side, and has no knowledge of the whole chain. In this chain, nodes offer services to all participants in the chain. Any node can offer any services available in the chain to connecting clients. Authentication and authorization (A&A) are only done at single node level. No user information or credentials are shared between nodes. Every node has their own A&A system, and this can be in any form.

A request for service that propagates through the chain will always be accepted as any request that comes in to the chain will be trusted by all nodes as soon as a node has been A&A by one of the nodes. The method is built around two steps, firstly establishing "trust" between nodes and exchange services to offer to each other, and secondly authentication of a request.

In the general case of the chain, one can assume a series of nodes, named node 1 (the first node) to node n (the terminal node). Node n and node n−1 connect, announce available services and establish trust for those services. The term "trust" is here used to mean that node n will allow node n−1 to get any of announced services to be executed when requested. Then node n−1 connects with n−2 and announces available services. Node n−1 will announce both its own services and the services available on node n, this without mentioning that those services are available on a second node. Now the chain goes on until a chain of trust is established all the way from Node 1 to Node n. All nodes will then announce available services (both local and via the established chain of trust) to any clients attached to them. This method of establishing trust is illustrated in FIG. 6.

Figure 6:
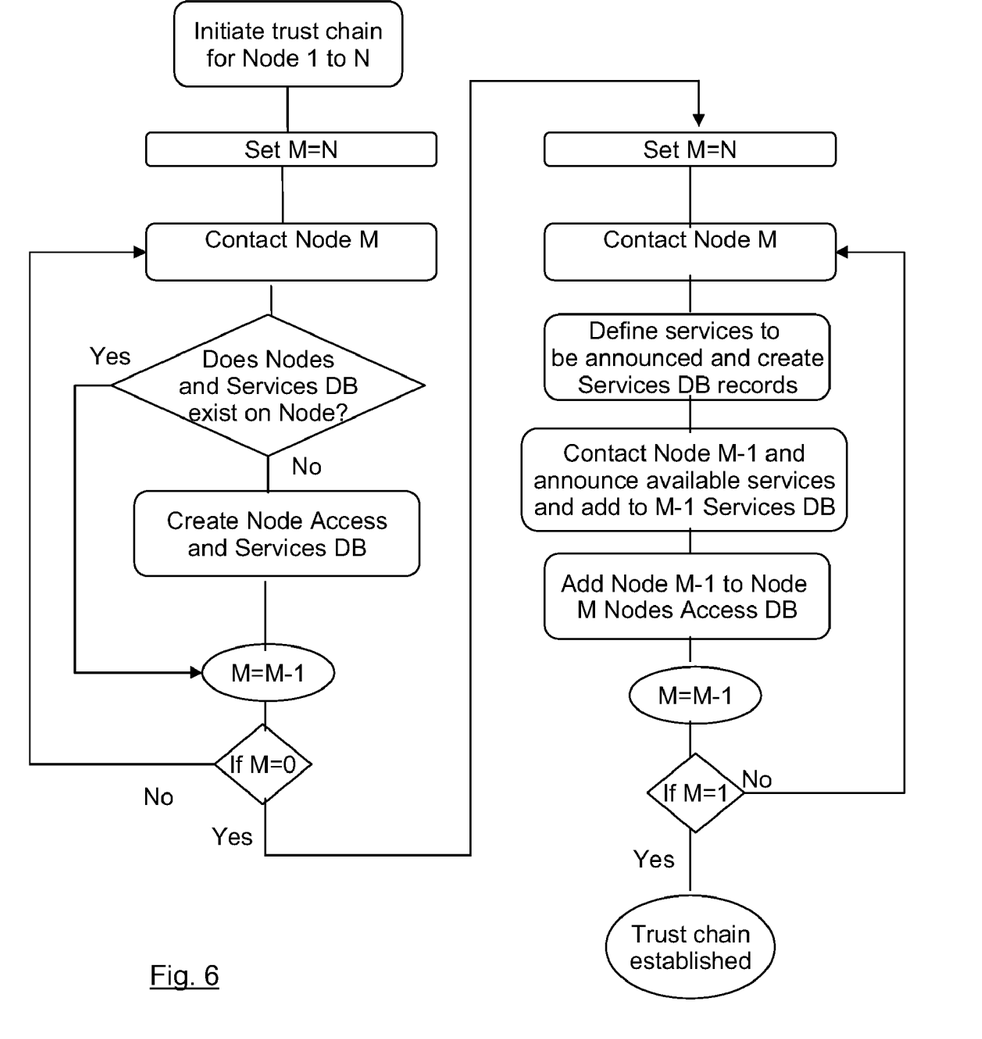
FIG. 6 is a flowchart of a method establishing trust in the chain of nodes.

The flowchart of FIG. 6 starts by cycling through the nodes one at a time to firstly create the necessary databases (DB) on each node. At the start of the flowchart, a variable M is set to N, the total number of nodes in the chain. Then for each node M, in turn, a check is made to see if node access and services databases are present on the node, and if they do not currently exist, then they are created on the specific node. An example of the structure of these databases is discussed below in more detail, with respect to the "Node Access Table" and the "Service Table".

Once the necessary databases have been created, where they did not already exist, then the variable M is once again set to N (the total number of nodes) and a process of announcing services occurs. Starting with the terminal node (node N), the services available are defined for that node and then the adjacent node (node M−1) is contacted and the available services are announced to that adjacent node. These are added to the services database of node M−1, and the node M−1 is added to the node access database of node M. This process identifies to an adjacent node the services available, and gives that node access to them. The variable M is then decremented, and the process is repeated until the first node, node 1, is reached. At this point, the trust chain is established.

In this general case, the execution of a request is handled as follows, illustrated in FIG. 7. Assuming that a client connects to node 1 and ask for a service, node 1 will authenticate and authorize the client based on its own, local, mechanism for this. Once the client is authenticated and authorized (A&A), node 1 will wrap its own "credentials" for the trust chain around the request and pass it on to node 2 for execution. Node 2 will now A&A this request based on node 1's "trust credentials" and either execute locally if it is a service locally available at node 2, or wrap its own trust credentials around the request and pass it on to node 3. This will go on until the request is execute by a node. Then the answer for the request will be passed pack step after step where the wrapped credentials will be pealed off for each step. The executing node will have no knowledge of the origin of the initial request.

Figure 7:
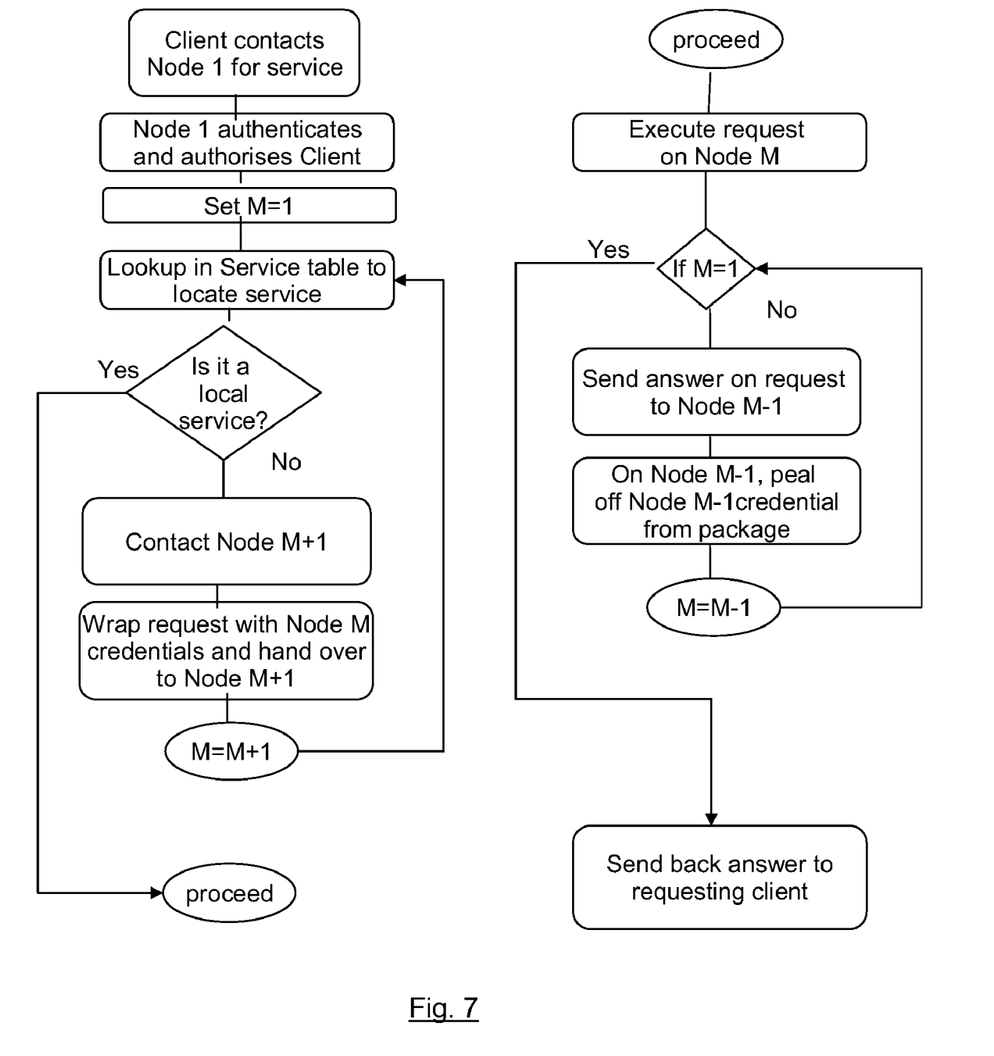
FIG. 7 is flowchart of a method of accessing a service on a node.

As shown in FIG. 7, node 1 is accessing a named service on a node further down the chain of nodes. The variable M is used to track through the nodes until the correct node is found that will execute the named service. Since the first node 1 is making the request, the variable M is first set to 1. Then the service requested is looked up in the service table stored by the node 1. This will identify whether the service required is a local service (available from that node) or is to be requested from an adjacent node. If the service is not local, then the node M contacts the node M+1, wraps the service request in the credentials of node M and passes that on to node M+1. This node then checks if the service is local. This process is repeated until the node is found for which the requested service is a local service (to be found on that node). Once this happens, then the flowchart moves through the "proceed" box to the second half of the method.

Once the "proceed" stage is reached, then the requested service is executed by the node M. If M=1 at this stage, meaning that the service was a local service on the first node, node 1, then the process terminates by providing the answer to the client that made the original service request. If the service is found on a different node (such that M>1) then a process of passing the answer back through the nodes in the chain is carried out, by decrementing M by 1 until M=1. During this process each node will "peal off" its own credentials when it receives the communication from an adjacent node, and forward the package to the adjacent M−1 node. When the package reaches the first node then the process terminates by providing the answer to the client.

In relation to the process and database description, on each node a database of trusted nodes and available services would be established. In the embodiment of FIGS. 1 to 4, separate databases where shown and described, but in the alternative embodiment now discussed, these are formed as a single database which has two tables, one table of known nodes and one table that holds the information about the services on each node.

The Node Access table defines "name", which is a name of the node, "IP", the IP address of the node and "Service_id", which is the key to the service table. For each service a certain node should be given access to, a line will be created in the Node table pointing to that "Service_id". The service table defines "Service_id", which is the key to the nodes table, "Real_node", the node that offered the service, "Real_location", which is the location of the service as announced by the node (to request a service, "real_node" is used together with the value of this field), and "announced_pseudo", which is the name of the service as the local node will announce it to other nodes. This means that for all services that are truly local, the "Real_location" will hold the true value of where to find the service on the local machine, but for all remote nodes, this value will be whatever the remote node has announced the services to be called, i.e. taken from that nodes "announced_pseudo" field. As an example of the database structure is as follows:

Node Access Table

| Name | IP | Service_id (key) |
|---|---|---|
| Node 1 | XX.XX.XX.XX | SID_1 |
| Node 1 | XX.XX.XX.YY | SID_2 |
| Local | 127.0.0.1 | SID_3 |

Service Table

| Service_id (key) | Real_node | Real_location | Announced_pseudo |
|---|---|---|---|
| SID_1 | Node 3 | announce_name_1 | service_1 |
| SID_2 | Node 3 | announce_name_2 | service_2 |
| SID_3 | Local | path/to/service | service_3 |

To illustrate a practical example of this embodiment of the database, a chain of three nodes is devised, and client access is given to node 1 in the chain. Node 1 has one local service called "process_customer". Node 2 has one local service called "find_product". Node 3 has one local service called "locate_person". Node 3 will announce its service to node 2. Node 2 will announce both its local service, and the service given from node 3, to node 1. Node 1 will announce all of the services, both the local one and the two given from node 2 to its A&A clients. The database tables on each node will look as follows. NB there is no connection/direct trust between Node 1 and Node 3, and in this example, services are only announced in one direction, i.e., node 1 has not announced any services to node 2 and node 2 has not announced any services to node 3.

Node 1

Node Access Table

| Name | IP | Service_id |
|---|---|---|
| Auth_clients | X.X.X.mm | SID_1 |
| Auth_clients | X.X.X.mm | SID_2 |
| Auth_clients | X.X.X.mm | SID_3 |

Service Table

| Service_id | Real_node | Real_location | Announced_pseudo |
|---|---|---|---|
| SID_1 | Local | /usr/bin/p_cust | process_customer |
| SID_2 | Node_2 | find_product | find_product |
| SID_3 | Node_2 | locate_person | locate_person |

Node 2

Node Access Table

| Name | IP | Service_id |
|---|---|---|
| Node_1 | X.X.X.1 | SID_1 |
| Node_1 | X.X.X.2 | SID_2 |

Service Table

| Service_id | Real_node | Real_location | Announced_pseudo |
|---|---|---|---|
| SID_1 | local | /usr/bin/f_pr | find_product |
| SID_2 | Node_3 | locate_person | locate_person |

Node 3

Node Access Table

| Name | IP | Service_id |
|---|---|---|
| Node_2 | X.X.X.2 | SID_1 |

Service Table

| Service_id (key) | Real_node | Real_location | Announced_pseudo |
|---|---|---|---|
| SID_1 | local | /usr/bin/l_pers | locate_person |

In the above example, the establishment of the trust services between two nodes can be a manual process. The systems administrators ("sysadm") on nodes 2 and 3 would contact each other. First "sysadm" on node 3 would create his local service table with information about the local service and where to find them (in example above, only one service). "Sysam" on node 2 will give "sysadm" on node 3 IP address of node 2. "Sysadm" on node 3 will add node 2 IP to the local Node Access table, and which service(s) this node is allowed to access. In return "sysadm" on node 2 will get the server ID and announced name of the service to put into his own Service Table. The next step is that "sysadm" on node 1 and 2 communicate. "Sysadm" on node 2 adds node 1 to the Node Access table and points to which services node 1 will be able to reach. "Sysadm" on node 1 will then update the Service table with available services. Finally "sysadm" on node 1 starts to give clients access to services by updating the local Nodes Access table.

In this example, to access a service on a node, a request for the service will travel via the chain of nodes in the following manner:

1) A client, client 1, accesses node 1 and requests the service locate_person.

2) Node 1 uses local A&A system to validate client.

a) A lookup is done in the Service Table to find service.

b) A double check in Nodes Access table is done to validate that this client is allowed to use the requested service.

c) Node 1 see that this service is offered by node 2, so the client request is encapsulated with the identity of node 1 and sent to node 2.

3) Node 2 receives the request from node 1 and no traditional authentication & authorization is executed.

a) The Access table and the Service table are consulted to validate that node 1 is allowed to access the requested service.

b) As this specific service is offered by node 3, node 2 encapsulates the request with its own identity (a second layer) and sends it to node 3 for processing 4) Node 3 receives the request and does NOT do a local A&A, but only consults the Access table and the Service table.
   a) The service table identify this service to be local, so the request is executed.
   b) The answer is sent back to node 2.
5) Node 2 gets the answer.
   a) Node 2 peals of its own credential layer and identify this request as origin from Node 1.
   b) Node 2 passes the answer back to node 1.
6) Node 1 gets the answer.
   a) Node 1 peals of its own credential and identifies this request to originate from client 1.
   b) Node 1 passes the answer to client 1.
7) Client 1 receives answer.

In this way, it is possible to provide a system and method that allows simple access to services offered by nodes in a secure fashion, but without the disadvantages of the prior art systems. There is no need to maintain any central repository of authenticated nodes, nor is there the requirement that the node offering the service must directly authenticate the node requesting access to the service. In this system, each node only authenticates adjacent nodes, and this creates a chain of trust between the nodes in the network.

While the invention has been particularly shown and described with reference to a preferred embodiment, it will be understood that various changes in form or detail may be made therein without departing from the spirit and scope of the invention.

The invention claimed is:

1. A system for accessing a service on a terminal node, the system comprising a chain of nodes, the chain comprising a first node, one or more intermediate nodes, and the terminal node, the terminal node maintaining the service, wherein:
   the first node is arranged to initiate an access request and to transmit the access request to an adjacent node;
   each intermediate node is arranged to authenticate the transmitting node and to transmit the access request to an adjacent node; and
   the terminal node is arranged to authenticate, using a computer device, the transmitting node and to execute the access request;
   wherein each node includes a database storing a list of authenticated nodes, the list identifying adjacent nodes that are authenticated, and wherein each node in the chain is arranged, upon receipt of an access request from an authenticated node, to encapsulate the access request with a local identifier.

2. The system according to claim 1, wherein each node includes a database storing a list of available services, each available service in the list provided by an external node having associated details of an adjacent node through which the respective service is accessible.

3. The system according to claim 1, wherein each node in the chain is arranged, upon receipt of a specific request from an authenticated node, to transmit the list of available services to the authenticated node.

4. A method of accessing a service on a terminal node, the node forming part of a system comprising a chain of nodes, the chain comprising a first node, one or more intermediate nodes, and the terminal node, the terminal node maintaining the service, the method comprising:
   initiating an access request at the first node;
   transmitting the access request to an adjacent node;
   authenticating the transmitting node at the adjacent node;
   repeating the transmitting and the authenticating for further nodes in the chain;
   receiving the access request at the terminal node;
   authenticating the transmitting node at the terminal node, using a computer device;
   executing the access request; and
   following receiving of an access request from an authenticated node, encapsulating the access request with a local identifier;
   wherein each node includes a database storing a list of authenticated nodes, the list identifying adjacent nodes that are authenticated.

5. The method according to claim 4, wherein each node includes a database storing a list of available services, each available service in the list provided by an external node having associated details of an adjacent node through which the respective service is accessible.

6. The method according to claim 4, further comprising:
   receiving a specific request at a node from an authenticated node, and transmitting the list of available services to the authenticated node.

* * * * *